E. J. HORNER.

Assignor to C. SCOTT and G. F. GODLEY.

CAR-SPRING.

No. 7,537.

Reissued Feb. 27, 1877.

Witnesses:

P. C. Dieterich

Frank T. Duffy

E. J. Horner Inventor:

Per, L. Lloyd Wiggins Attorney.

N. PETERS, PHOTO-LITHOGRAPHER, WASHINGTON, D. C.

UNITED STATES PATENT OFFICE.

EDWIN J. HORNER, OF WILMINGTON, DELAWARE, ASSIGNOR TO CHARLES SCOTT AND GEORGE F. GODLEY.

IMPROVEMENT IN CAR-SPRINGS.

Specification forming part of Letters Patent No. 89,999, dated May 11, 1869; reissue No. 7,537, dated February 27, 1877; application filed February 13, 1877.

*To all whom it may concern:*

Be it known that I, EDWIN J. HORNER, of the city of Wilmington, county of New Castle, State of Delaware, have invented certain new and useful Improvements in Car-Springs; and do hereby declare the following is a full, clear, and exact description thereof, reference being had to the accompanying drawings, and to the letters of reference marked thereon.

My invention relates to an improvement on the car-spring patented by me November 10, 1868; and consists in the arrangement of one or more series of spiral springs placed outside each other, and increasing in size from the inner spring to the outer, the several springs of each set being of such lengths relatively to each other, and their supports, or the surfaces between which they are compressed, that the outer or more flexible spring will first be compressed, and the inner springs successively afterward, thus adapting the spring to sustain light or heavy loads, and maintain a freedom of elasticity not found in springs that are simultaneously compressed throughout their entire range of action. The inner spring of all is placed around a rubber pin.

In order to enable others skilled in the art to which my invention appertains to make and use the same, I will now proceed to describe its construction and operation, referring to the annexed drawings, which form a part of this specification, and in which—

Figure 1:
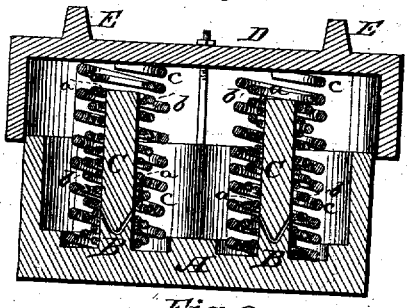
Figure 2:
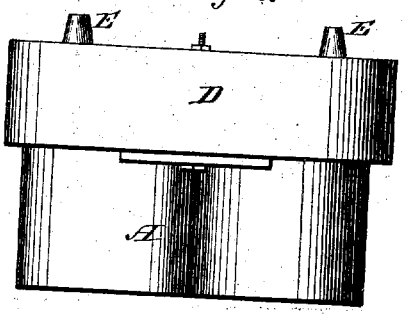
Figure 3:
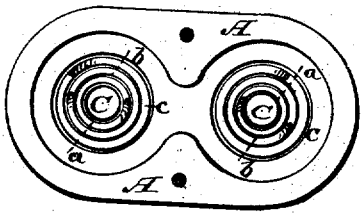

Figure 1 is a longitudinal vertical section, and Fig. 2 is a side elevation, and Fig. 3 plan view, with cover removed.

A represents a box in which the springs are placed. In the bottom of said box are one, two, or more pins, B, projecting a suitable distance upward, the upper end of which is cut out in the shape of a funnel, as shown in Fig. 1.

On the pin B is placed a rubber pin, C, the lower end of which is pointed to correspond with the shape of the pin B, and fit in the same.

Around the pins C and B is placed a spiral spring, *a*, which rests on the bottom of the box A, and may extend a trifle above the rubber pin C. Around the spiral spring *a* is placed another spiral spring, *b*, which is heavier than the first spring and rests also on the bottom of the box A, but extends a suitable distance above the first spring *a*. Around the spring *b* is placed a still heavier spring, *c*, also resting on the bottom of the box, and extending above the spring *b*, and so on. I may continue placing still larger and heavier springs around the former according to the weight desired to be carried.

On the top of the box A is placed the lid D, which is, on its upper side, provided with pins E E for the purpose of securing the cross-beam of the car. Any number of such series of springs, as above described, may be used, and I do not confine myself to the particular shape of the box shown in the drawings, nor, in fact, to a box at all, as the spring may be used without being so inclosed.

Having thus fully described my invention, what I claim as new, and desire to secure by Letters Patent, is—

1. A graduated car-spring consisting of two or more spiral springs of unequal diameters, one within the other, and supported by plates or bearings, so that the pressure is received by an inner spring after having first compressed an outer spring or springs, as set forth and described.

2. In combination with one, two, or more spiral springs, constructed as herein described, the rubber pin C tapering at its lower end, and resting on the stationary pin B, substantially as and for the purpose set forth.

Witnesses: E. J. HORNER.

JAMES W. BARR,

JOHN BARR.